United States Patent [19]

Ogawa et al.

[11] Patent Number: 5,272,225
[45] Date of Patent: Dec. 21, 1993

[54] BRANCHED ORGANOPOLYSILOXANES

[75] Inventors: Takuya Ogawa; Toshio Suzuki, both of Kanagawa, Japan

[73] Assignee: Dow Corning Japan Ltd., Tokyo, Japan

[21] Appl. No.: 963,161

[22] Filed: Oct. 19, 1992

[30] Foreign Application Priority Data

Oct. 31, 1991 [JP] Japan .................. 3-286745

[51] Int. Cl.$^5$ ......................................... C08F 283/00
[52] U.S. Cl. ................................ 525/477; 525/474; 528/14; 528/15; 528/31; 528/37; 528/39
[58] Field of Search .................. 525/474, 477; 528/39, 528/31, 14, 15, 32

[56] References Cited

U.S. PATENT DOCUMENTS

4,946,921  8/1990  Shirahata et al. ............... 528/39
5,011,901  4/1991  Fukutani et al. ............... 528/39

FOREIGN PATENT DOCUMENTS

0294277  7/1988  European Pat. Off. .
0348705  3/1990  European Pat. Off. .

OTHER PUBLICATIONS

Polymer Science U.S.S.R., vol. 10, 1968, Oxford, GB, pp. 49-55, K. A. Adrianov et al., "Study of Polydimethylsiloxanes with 3- and 4-Functional Centres of Branching".
Polymer Sci U.S.S.R. vol. 23, No. 6, Jun. 1982, Oxford, GB pp. 1562-1569, I. I. Tverdokhlebova et al. "Synthesis and Properties of Star-Shaped Polymethylphenyl Siloxane".
Chemical Abstracts, vol. 112, No. 8, Feb. 19, 1990, Columbus, Ohio, US; abs; & Bull. Pol. Acad. Sci., Chem. vol. 36, 1989, pp. 91-97.
Polymer Bulletin, H. Huang et al, vol. 14 (1985) pp. 557-564.

*Primary Examiner*—Melvyn I. Marquis
*Attorney, Agent, or Firm*—William F. Boley

[57] ABSTRACT

The introduction of a branched organopolysiloxane in which polysiloxane with the formula $SiO_2$ constitutes the branching center or branch origin and the terminal on only one side of diorganopolysiloxane is bonded to the branch origin wherein this bonding is exactly to the branch origin. The branched organopolysiloxane is described by formula $$(SiO_{4/2})_x(R^1{}_2ASiO_{\frac{1}{2}})_y(R^1{}_3SiO_{\frac{1}{2}})_z(RO_{\frac{1}{2}})_u,$$

wherein each $R^1$ is independently selected from a group consisting of $C_{1-8}$ alkyls, haloalkyls, alkenyls, and aryls; A is described by formula $$-(OSiR^2R^3)_n-R^4$$

wherein $R^2$ and $R^3$ are independently selected from a group consisting of $C_{1-8}$ alkyls, haloalkyls, alkenyls, and aryls, $R^4$ is selected from a group consisting of $C_{1-8}$ alkyls, haloalkyls, alkenyls, hydrogen atom and hydroxyl, and $1 \leq n \leq 1,000$; R is selected from a group consisting of hydrogen atom and $C_{1-8}$ alkyls; $2 \leq x \leq 500$; $0 \leq z$; $0 \leq u \leq 15$; $2 \leq y+z+u \leq 150$; $0.3 \leq (y+z+u)/x \leq 3.0$; $z+u > 0$; and $0 \leq u/(y+z+u) \leq 0.1$.

18 Claims, No Drawings

BRANCHED ORGANOPOLYSILOXANES

BACKGROUND OF THE INVENTION

The present invention relates to a novel branched organopolysiloxane and to a method for its preparation. More specifically, the present invention relates to a novel branched organopolysiloxane, and to a method for its preparation, in which the central branch region or element (the branch origin) is a polysiloxane unit represented by the formula $SiO_2$ and the branch moiety proper is a diorganopolysiloxane unit.

Numerous branched organopolysiloxanes have already been proposed and even commercialized. However, there are few reports relative to branched organopolysiloxane in which the central structure of the branch is a polysiloxane unit with the formula $SiO_2$. Moreover, many of these branched organopolysiloxanes reported to date are no more than the product of simply mixing and reacting $SiO_2$ component with diorganopolysiloxane component, and their structures are by no means clear. For example, the reaction of hydroxy-terminated polydimethylsiloxane and tetraethyl silicate by the sol-gel process to produce polymer has been reported (H. Huang, et al., *Polymer Bulletin*, Volume 14, pp. 557–564 (1985)). However, a clear structure was not reported for this polymer, and both ends of the diorganopolysiloxane in this polymer are bonded to branch points. To date, there have been no reports of a so-called "star organopolysiloxane" in which polysiloxane with the formula $SiO_2$ constitutes the branch origin and only one side of the diorganopolysiloxane component is bonded to the branch origin wherein this bonding is exactly to the branch origin.

SUMMARY OF THE INVENTION

The present invention relates to a novel branched organopolysiloxane and to a method for its preparation. More specifically, the present invention relates to a novel branched organopolysiloxane in which the central branch region or element (the branch origin) is a polysiloxane unit represented by the formula $SiO_2$ and the branch moiety proper is a diorganopolysiloxane unit.

DESCRIPTION OF INVENTION

Accordingly, the present invention takes as its object the introduction of a branched organopolysiloxane in which polysiloxane with the formula $SiO_2$ constitutes the branching center or branch origin and only one terminal of the diorganopolysiloxane is bonded to the branch origin wherein this bonding is exactly to the branch origin.

As the result of focussed research directed at achieving the aforesaid object, the present invention were successful in synthesizing branched organopolysiloxane described by the following formula (I)

$$(SiO_{4/2})_x(R^1{}_2ASiO_{\frac{1}{2}})_y(R^1{}_3SiO_{\frac{1}{2}})_z(RO_{\frac{1}{2}})_u,$$

wherein each $R^1$ is independently selected from a group consisting of $C_{1-8}$ alkyls, haloalkyls, alkenyls, and aryls; A is described by the formula

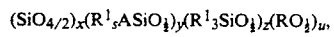
$-(OSiR^2R^3)_n-R^4$, wherein $R^2$ and $R^3$ are independently selected from a group consisting of $C_{1-8}$ alkyls, haloalkyls, alkenyls, and aryls, $R^4$ is selected from a group consisting of $C_{1-8}$ alkyls, haloalkyls, alkenyls, hydrogen atom, and hydroxyl, and $1 \leq n \leq 1,000$; R is selected from the group consisting of hydrogen atom and $C_{1-8}$ alkyls; $2 \leq x \leq 500$; $2 \leq y+z+u \leq 150$; $2 \leq y$; $0 \leq z$; $0 \leq u \leq 15$; $0.3 \leq (y+z+y)/x \leq 3.0$; and $0 \leq u/(y+z+u) \leq 0.1$.

To explain the preceding in greater detail, the branched organopolysiloxane according to the present invention contains x $SiO_2$ units in each molecule, and this fraction forms the centers of nuclei in the branched organopolysiloxane. The value x is at least 2 and in particular is at least 4. The size of x is not specifically restricted, but in general the resulting branched organopolysiloxane is insoluble in solvent when x exceeds 500, which substantially impairs handling. Values of $x \leq 100$ are preferred from the standpoint of processability.

The $R^1{}_2ASiO_{\frac{1}{2}}$ unit is another crucial moiety in the branched organopolysiloxane of the present invention, and the value of y specifies the number of such units in each molecule. Again, the size of y is not specified restricted as long as it is at least 2, but y preferably has a value of at least 3 from the standpoint of obtaining a "branched configuration." The upper limit on y is 150, since the synthesis of molecules in which y is greater than this value is highly problematic. Each $R^1$ substituent is independently selected from the group consisting of $C_{1-8}$ alkyls, aryls, alkenyls, and haloalkyls; however, economic efficiency argues for a selection from a group consisting of methyl, phenyl, and vinyl.

The unit A is diorganopolysiloxane described by the following formula

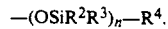
$-(OSiR^2R^3)_n-R^4.$

Its degree of polymerization n must be at least 1, but again this is not specifically restricted. The size of n determines the length of the "branch" moiety proper of the branch. When this is too large, the molecular weight of the overall branched organopolysiloxane becomes too large and the viscosity becomes very high, which degrades the processability. The preferred value of n for practical applications is 1 through 1,000. Within the individual molecule, the substituents $R^2$, $R^3$, and $R^4$ in the diorganopolysiloxane may be identical to each other or may differ from each other. $R^2$ and $R^3$ are selected from the groups provided above as examples of $R^1$, but they are preferably selected from a group consisting of methyl, phenyl, and vinyl based on economic efficiency. $R^4$ is preferably selected from a group consisting of methyl, vinyl, hydrogen atom, and hydroxy.

The $R^1{}_3SiO_{\frac{1}{2}}$ unit is not as essential constituent element of the branched organopolysiloxane of the present invention, and z may therefore assume a value of 0. The number of branches, the size of the nucleus, and so forth in the branched organopolysiloxane according to the present invention are controlled through this unit. Thus, the ratio $(y+z)/x$ determines nucleus size: smaller values of this ratio give a larger nucleus. For the same nucleus size, a larger number of branches will be present at smaller values of z. The upper limit for z is restricted due to the difficulty of synthesizing molecules in which $(y+z+u)$ exceeds 150.

The $RO_{\frac{1}{2}}$ unit is a residual group that will be present in accordance with the purity of the starting material. Its proportion must be no more than 10% of the total number of constituent units excluding $SiO_{4/2}$ units.

The branched organopolysiloxane according to the present invention can be produced, for example, by the following method. A silanol-containing organopolysiloxane described by formula (II)

$$(SiO_2)_x\{R^1_2(HO)SiO_{\frac{1}{2}}\}_y(R^1_3SiO_{\frac{1}{2}})_z(RO_{\frac{1}{2}})_u$$

is first reacted with an alkali metal compound; this is followed by reaction with cyclic diorganopolysiloxane; and endcapping is finally carried out with triorganomonohalosilane or protic acid to afford the branched organopolysiloxane according to the present invention.

The starting silanol-containing organopolysiloxane (II) in the aforementioned preparative method can itself be prepared by methods known in the art. For example, the silanol-containing organopolysiloxane can be prepared by hydrolysis of SiH-containing organopolysiloxane described by formula $$(SiO_2)_x(R^1_2HSiO_{\frac{1}{2}})_y(R^1_3SiO_{\frac{1}{2}})_z$$

in a suitable solvent in the presence of a basic catalyst or transition-metal catalyst. In specific terms, the use is recommended of a basic catalyst such as an alkali metal hydroxide or bicarbonate, i.e., sodium hydroxide, sodium bicarbonate, etc., or a transition-metal compound such as palladium/carbon, palladium acetate, platinum/carbon, and so forth.

As stated above, the silanol-containing organopolysiloxane prepared as described above may contain the $RO_{\frac{1}{2}}$ unit.

This silanol-containing organopolysiloxane is then reacted with an alkali metal compound, optionally in a suitable solvent, to afford the alkali metal salt of the silanol group of the silanol-containing organopolysiloxane, which is subsequently reacted with cyclic diorganopolysiloxane. The solvent is not specifically restricted, but a solvent with an appropriate polarity is preferred due to the desirability of obtaining good dissolution of the starting silanol-containing organopolysiloxane material, the alkali metal salt product, and the branched organopolysiloxane final product. In some cases, good results are obtained through the use of a mixture of nonpolar solvent and polar solvent. Reaction solvents that satisfy these conditions are exemplified by aliphatic hydrocarbons such as pentane, hexane, heptane, and octane; aromatic hydrocarbons such as benzene, toluene, and xylene; ether solvents such as diethyl ether, dibutyl ether, diphenyl ether, dioxane, and tetrahydrofuran; ester solvents such as ethyl acetate and butyl acetate; ketone solvents such as acetone, methyl ethyl ketone, and methyl butyl ketone; halogenated solvents such as carbon tetrachloride, chloroform, trichloroethane, trichloroethylene, and tetrachloroethylene; acetonitrile; dimethylformamide; dimethyl sulfoxide; and hexamethylphosphoramide. However, the reaction solvent is not limited to the preceding.

The alkali metal compound used to convert the silanol group of the silanol-containing organopolysiloxane into its alkali metal salt is exemplified by the alkyl and aryl compounds of alkali metals such as lithium, sodium, potassium, and cesium and by the amide compounds of these metals. The methyl, ethyl, propyl, and butyl compounds of these alkali metals are generally preferred due to their ease of acquisition. Methyllithium and butyllithium are examples of preferred alkali metal compounds.

The resulting alkali metal salt of the silanol-containing organopolysiloxane is reacted with cyclic diorganopolysiloxane in order to grow the branch moiety proper. This reaction is already known as the ring-opening polymerization of polysiloxane. The cyclic diorganopolysiloxane used here is not specifically restricted; however, cyclic trisiloxane, cyclic tetrasiloxane, and cyclic pentasiloxane are preferred from considerations of reactivity and facile control of the structure, and cyclic trisiloxane is particularly preferred.

This ring-opening polymerization reaction is stopped by the addition of triorganomonohalosilane or protic acid, which results in a triorganosilyl group (in which the halogen is removed from the added triorganomonohalosilane) or hydroxyl group bonded at each terminal of the branch moiety proper. This triorganomonohalosilane is also not specifically restricted, and need merely be a silane compound that contains one atom selected from the chlorine, bromine, iodine, and fluorine atoms. Chlorosilane is strongly preferred from the standpoints of economic efficiency and ease of acquisition. Other than the halogen atom, the silicon-bonded organic groups are exemplified by the organic groups provided above as examples of $R^1$ and $R^4$. The protic acid, which is used to place the hydroxyl group at the end of the branched organopolysiloxane, may be any protic acid that can neutralize alkali metal silanolate to yield the hydroxyl group. This protic acid is exemplified by inorganic acids such as hydrochloric acid, sulfuric acid, nitric acid, phorphoric acid, and carbonic acid, and by organic acids such as acetic acid, propionic acid, and benzoic acid.

This reaction series can be run at room temperature, with cooling, or at elevated temperature, and this is completely dependent on the type of alkali metal compound and the type of cyclic diorganopolysiloxane used. The suitable temperature range for this reaction series is generally −80 to +200° C., and a more suitable temperature range is −25 to +160° C.

As explained hereinbefore, the branched organopolysiloxane (I) according to the present invention is a novel compound, and it is useful as a starting material or reinforcing component for silicone elastomers. It is also useful as an additive for improving the fluid properties of silicone fluids.

The present invention is explained more specifically below through illustrative examples; however, the present invention is not limited to the examples.

EXAMPLE 1

About 23 g of a silanol-containing organopolysiloxane (weight-average molecular weight=900) with the average formula $$\{Me_2(OH)SiO_{\frac{1}{2}}\}_{6.4}(SiO_2)_{4.0}$$

was dissolved in 150 mL tetraydrofuran and this was held on an ice bath at 0° C. To this solution was then added 107 mL of a 1.69 molar hexane solution of n-butyllithium over 1 hour. To the resulting reaction solution was added a tetrahydrofuran solution of hexamethylcyclotrisiloxane (160 g as hexamethylcyclotrisiloxane) and stirring was continued. The decline in hexamethylcyclotrisiloxane was monitored by gas chromatography, and the reaction of ≧95% of the charge was confirmed. In order to terminate the reaction, 22 g dimethylvinylchlorosilane was subsequently added with stirring for an additional 1 hour.

After removal of the solid product by filtration water-washing and drying afforded 170 g of branched organopolysiloxane (yield=86%) described by the formula $(Me_2ASiO_{\frac{1}{2}})_{6.4}(SiO_2)_{4.0}$, wherein $A=(OSiMe_2)_{1-3}Vi$. The weight-average molecular weight as measured by gel permeation chromatography was 6,900, and the dispersivity was 1.5. Quantitative analysis of the vinyl group at the terminals of the branch chains gave a value of 2.7% (calculated=2.5%).

The following data were obtained by $^1$H-NMR (ppm, in deuterochloroform, $CHCl_3$ reference (7.24 ppm)).

| |
|---|
| 0–0.2 (84 H, multi) |
| 5.7–5.8 (1 H, q) |
| 5.9–6.0 (1 H, q) |
| 6.1–6.2 (1 H, q) |

The following data were obtained by $^{29}$Si-NMR (ppm, in deuterochloroform, TMS reference).

| |
|---|
| −4.1 (Si-Vi) |
| −18–23 (Si-Me$_2$) |
| −105–112 (SiO$_2$) |

EXAMPLE 2

The compound $(Me_2ASiO_{\frac{1}{2}})_{6.4}(SiO_2)_{4.0}$, wherein $A=(OSiMe_2)_{13}Me$, was synthesized in a yield of 89% by the reaction described in Example 1, but in this case using 20 g trimethylchlorosilane in place of the dimethylvinylchlorosilane. The average molecular weight was 6,800.

EXAMPLE 3

The compound $(Me_2ASiO_{\frac{1}{2}})_{6.4}(SiO_2)_{4.0}$, wherein $A=(OSiMe_2)_{12}OH$, was synthesized in a yield of 81% by the reaction described in Example 1, but in this case using 11 g acetic acid in place of the dimethylvinylchlorosilane. The average molecular weight was 6,500.

EXAMPLE 4

The compound $(Me_2ASiO_{\frac{1}{2}})_{6.5}(SiO_2)_{4.0}$, wherein $A=(OSiMe_2)_{25}Vi$, was synthesized in a yield of 90% by the reaction described in Example 1 by changing the addition of the tetrahydrofuran solution of hexamethylcyclotrisiloxane to 320 g (as hexamethylcyclotrisiloxane). The average molecular weight was 12,500.

EXAMPLE 5

The compound $(Me_2ASiO_{\frac{1}{2}})_{12}(SiO_2)_{10}$, wherein $A=(OSiMe_2)_{13}Vi$, was synthesized in a yield of 88% by the reaction described in Example 1, but in the present case starting from 25 g of $\{Me_2(OH)SiO_{\frac{1}{2}}\}_{12}(SiO_2)_{10}$ (weight-average molecular weight=1,600). The average molecular weight was 13,000.

EXAMPLE 6

The compound $(Me_2ASiO_{\frac{1}{2}})_{6.4}(SiO_2)_{4.0}(Me_3SiO_{\frac{1}{2}})_{0.4}$, wherein $A=(OSiMe_2)_{13}Vi$, was synthesized in a yield of 88% by the reaction described in Example 1, but in the present case starting from 23 g of $\{Me_2(OH)SiO_{\frac{1}{2}}\}_{6.4}(SiO_2)_{4.0}(Me_3SiO_{\frac{1}{2}})_{0.4}$ (weight-average molecular weight=800). The average molecular weight was 5,900.

EXAMPLE 7

The compound $(Me_2ASiO_{\frac{1}{2}})_{6.4}(SiO_2)_{4.0}$, wherein $A=O(SiPh_2O)_{12}SiMe_2Vi$, was synthesized in a yield of 61% by the reaction described in Example 1, but in the present case using a reaction temperature of 160° C., a reaction time of 15 hours, and a diphenyl ether solution of hexaphenylcyclotrisiloxane (428 g as hexaphenylcyclotrisiloxane) in place of the tetrahydrofuran solution of hexamethylcyclotrisiloxane. The average molecular weight was 16,500.

EXAMPLE 8

The compound $(Me_2ASiO_{\frac{1}{2}})_{6.4}(SiO_2)_{4.0}$, wherein $A=O(SiMe(C_2H_4CF_3)O)_{12}SiMe_2Vi$, was synthesized in a yield of 80% by the reaction described in Example 1, but in the present case using 337 g 1,3,5-trimethyl-1,3,5-tris(3,3,3-trifluoropropyl)cyclotrisiloxane in place of the tetrahydrofuran solution of hexamethylcyclotrisiloxane. The average molecular weight was 9,900.

The following data were obtained by $^1$H-NMR (ppm, in acetone-d$_6$, $CH_3COCH_3$ reference (2.04 ppm)).

| |
|---|
| 0.2–0.3 (48 H, multi) |
| 0.8–0.9 (24 H, multi) |
| 2.1–2.3 (24 H, multi) |
| 5.4–6.2 (3 H, multi) |

The following data were obtained by $^{29}$Si-NMR (ppm, in acetone-d$_6$, TMS reference).

| |
|---|
| −2.2 (Si-Vi) |
| −20.0 (Si-Me) |
| −22.1 (Si—C$_2$H$_4$CF$_3$) |
| 106–112 (SiO$_2$) |

EXAMPLE 9

The compound $(Me_2ASiO_{\frac{1}{2}})_{6.4}(SiO_2)_{4.0}(MeO)_{0.3}$, wherein $A=(OSiME_2)_{13}Vi$, was synthesized in a yield of 90% by the reaction described in Example 1, but in the present case starting from 23 g of $\{Me_2(OH)SiO_{\frac{1}{2}}\}_{6.4}(SiO_2)_{4.0}(MeO)_{0.3}$ (weight-average molecular weight=900). The average molecular weight was 7,000.

We claim:

1. A branched organopolysiloxane described by formula $$(SiO_{4/2})_x(R^1{}_2ASiO_{\frac{1}{2}})_y,$$

wherein each $R^1$ is independently selected from a group consisting of $C_{1-8}$ alkyls, haloalkyls, alkenyls, and aryls; A is described by formula $$-(OSiR^2R^3)_n-R^4,$$

wherein $R^2$ and $R^3$ are independently selected from a group consisting of $C_{1-8}$ alkyls, haloalkyls, alkenyls, and aryls, $R^4$ is selected from a group consisting of $C_{1-8}$ alkyls, haloalkyls, alkenyls, hydrogen atom, and hydroxyl, and $1 \leq n \leq 1,000$; $2 \leq x \leq 500$; $2 \leq y \leq 150$; and $0.3 \leq y/x \leq 3.0$.

2. The branched organopolysiloxane of claim 1 wherein each $R^1$, $R^2$, and $R^3$ is independently selected from a group consisting of methyl, phenyl, vinyl, and trifluoropropyl.

3. The branched organopolysiloxane of claim 1 wherein $R^4$ is selected from a group consisting of methyl, vinyl, hydrogen atom, and hydroxyl.

4. The branched organopolysiloxane of claim 1 wherein each $R^1$, $R^2$, and $R^3$ is independently selected from a group consisting of methyl, phenyl, vinyl, and trifluoropropyl, and $R^4$ is selected from a group consisting of methyl, vinyl, hydrogen atom, and hydroxyl.

5. The branched organopolysiloxane of claim 1 wherein each of $R^1$, $R^2$, and $R^3$ is independently selected from a group consisting of methyl, phenyl, and trifluoropropyl, and $R^4$ is selected from a group consisting of methyl, vinyl, hydrogen atom, and hydroxyl.

6. The branched organopolysiloxane of claim 1 wherein $2 \leq x \leq 100$.

7. The branched organopolysiloxane of claim 1 wherein $4 \leq x \leq 100$.

8. The branched organopolysiloxane of claim 1 wherein $3 \leq y \leq 150$.

9. The branched organopolysiloxane of claim 1 wherein each $R^1$, $R^2$, and $R^3$ is independently selected from a group consisting of methyl, phenyl, vinyl, and trifluoropropyl, $R^4$ is selected from a group consisting of methyl, vinyl, hydrogen atom, and hydroxyl; $4 \leq x \leq 100$; and $3 \leq y \leq 150$.

10. A branched organopolysiloxane described by formula $(SiO_{4/2})_x(R^1{}_2ASiO_{\frac{1}{2}})_y(R^1{}_3SiO_{\frac{1}{2}})_z(RO_{\frac{1}{2}})_u$, wherein each $R^1$ is independently selected from a group consisting of $C_{1-8}$ alkyls, haloalkyls, alkenyls, and aryls; A is described by formula $$-(OSiR^2R^3)_n-R^4.$$

wherein $R^2$ and $R^3$ are independently selected from a group consisting of $C_{1-8}$ alkyls, haloalkyls, alkenyls, and aryls, $R^4$ is selected from a group consisting of $C_{1-8}$ alkyls, haloalkyls, alkenyls, hydrogen atom and hydroxyl, and $1 \leq n \leq 1,000$; R is selected from a group consisting of hydrogen atom and $C_{1-8}$ alkyls; $2 \leq x \leq 500$; $2 < y+z+u \leq 150$; $2 \leq y$; $0 \leq z$; $0 \leq u \leq 15$; $0.3 \leq (y+z+u)/x \leq 3.0$; $z+u > 0$; and $0 \leq u/(y+z+u) \leq 0.1$.

11. The branched organopolysiloxane of claim 10 wherein each $R^1$, $R^2$, and $R^3$ is independently selected from a group consisting of methyl, phenyl, vinyl, and trifluoropropyl.

12. The branched organopolysiloxane of claim 10 wherein $R^4$ is selected from a group consisting of methyl, vinyl, hydrogen atom, and hydroxyl.

13. The branched organopolysiloxane of claim 10 wherein each $R^1$, $R^2$, and $R^3$ is independently selected from a group consisting of methyl, phenyl, vinyl, and trifluoropropyl, and $R^4$ is selected from a group consisting of methyl, vinyl, hydrogen atom, and hydroxyl.

14. The branched organopolysiloxane of claim 10 wherein each $R^1$, $R^2$, and $R^3$ is independently selected from a group consisting of methyl, phenyl, and trifluoropropyl, and $R^4$ is selected from a group consisting of methyl, vinyl, hydrogen atom, and hydroxyl.

15. The branched organopolysiloxane of claim 10 wherein $2 \leq x \leq 100$.

16. The branched organopolysiloxane of claim 10 wherein $4 \leq x \leq 100$.

17. The branched organopolysiloxane of claim 10 wherein $3 < y+z+y \leq 150$.

18. The branched organopolysiloxane of claim 10 wherein each $R^1$, $R^2$, and $R^3$ is independently selected from a group consisting of methyl, phenyl, vinyl, and trifluoropropyl, $R^4$ is selected from a group consisting of methyl, vinyl, hydrogen atom, and hydroxyl; $4 \leq x \leq 100$; and $3 < y+z+u \leq 150$.

* * * * *